INVENTOR.
Theodore A. Gens

United States Patent Office 3,320,179
Patented May 16, 1967

3,320,179
OPENLY POROUS REFRACTORY NUCLEAR
FUEL MICROSPHERES AND METHOD OF
PREPARATION
Theodore A. Gens, Tonawanda, N.Y., assignor to the
United States of America as represented by the United
States Atomic Energy Commission
Filed Sept. 22, 1966, Ser. No. 582,200
13 Claims. (Cl. 252—301.1)

The invention described herein was made in the course of, or under, a contract with the U.S. Atomic Energy Commission.

The present invention relates to refractory fuel microspheres and more particularly to fuel microspheres having controlled porosity.

While reactor technology has generally proceeded along the lines of providing a dense, or near theoretically dense, fuel core surrounded by one or more coatings of various refractory materials, a recent concept embodies providing a porous fuel core. Such type fuels have high utility, especially as fast fuels, inasmuch as the pores contained within the fuel core can accommodate gaseous fission products, thereby extending the performance life of the fuel. Moreover, swelling of the particulate can be relieved to some degree by expansion into the pores, thus decreasing the stress on the coating; for this a void volume of at least 15% of the particle volume is required. Of particular interest is the potential of these fuels as emitting fuels, i.e., uncoated fuels which have pores opening to the surface which communicate with inner pores; thereby, providing for release of volatile neutron poisons as they are generated.

Attempts have been previously made to prepare reactor fuel microspheres having high porosity but to date have been generally unsuccessful. This is not to be interpreted as saying these methods did not produce some porosity. What is meant, however, is that no successful method has been discovered which will prepare microspheres having a high degree of porosities, i.e., ranging upwards to 45% of particle volume, but still have sufficient strength to permit subsequent handling without complete collapse of the macrostructure. One such method comprised incorporating carbon at the sol stage with subsequent removal of the carbon by firing during the calcination step; thus resulted in a small volume percent of porosity (i.e., about 3 volume percent).

It is therefore a primary object of this invention to provide refractory fuel microspheres which have a high degree of open porosity.

Another object is to provide a refractory fuel particle which has increased performance life.

Still a further object is to provide porous refractory fuel microspheres which have pore diameters within the range of 1–10 microns.

A still further object is to provide a refractory fuel particle which is useful as an emitting fuel.

A further object is to provide methods for preparing such refractory fuel particles which are characterized by having controlled open porosity.

In accordance with the above and other objects of the invention, it has been found that refractory fuel microspheres having a high degree of porosity of a uniform pore size can be prepared employing sol-gel techniques by incorporating a volatile inorganic pore former, which volatilizes during firing, within the gel microspheres prior to calcination of the gel microspheres to product microspheres. The basic sol-gel process for preparing refractory fuel microspheres from stable heavy metal sols comprises passing the heavy metal sol into a sphere-forming column, dehydrating the sol droplets to form gel microspheres, collecting the gel microspheres at the bottom of the column, air drying the gel microspheres and finally calcining the gel microspheres to essentially theoretically dense refractory fuel microspheres. As used herein the term "heavy metal" is intended to refer to actinide metals such as thorium, uranium, plutonium and mixtures thereof, and "refractory" fuel microspheres to include oxide, nitrides and the like. It should further be appreciated that by the term "mixtures" it is intended to refer, not only to such heavy metals as thorium, uranium, plutonium, etc., but also to other selected metals, such as zirconium, which may be added to such fuels to improve specific properties, e.g., strength. The essence of applicant's invention is the discovery that highly porous microspheres can be prepared by modification of the sol-gel process. The major modification is the incorporation of an inorganic volatile material at the gel stage which is subsequently removed by volatilization during calcination, thereby forming a network of pores which are open to the surface of the microspheres.

Figure 1:
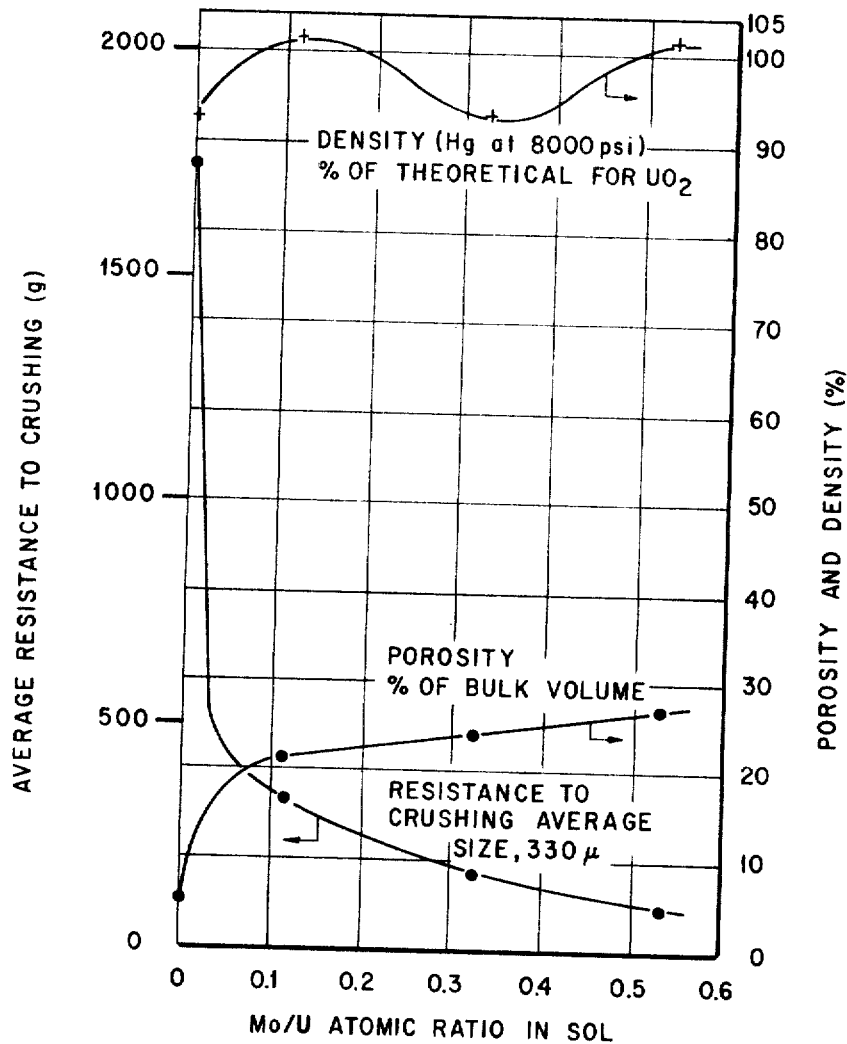
FIGURE 1 is a plot showing porosity and resistance to crushing of fired $UO_2$ microspheres prepared from 1 M tetravalent uranium solution as a function of Mo/U atomic ratio in the sol.

It is quite surprising that sol-gel derived refractory fuel microspheres could be prepared with a high degree of porosity, i.e., up to about 45% of the microsphere volume, without complete collapse of the crystalline macrostructure. In this respect, it should be noted that, while the resistance to crushing decreased with increasing porosities above about 5%, the microspheres which had porosities as high as about 44% had sufficient strength, i.e., at least 100 grams, to withstand subsequent handling processes, i.e., coating processes. While applicant does not wish to be bound by any rigid theory, it is thought that the heavy metal ions may complex the volatile inorganic material, with the volatile material not being volatilized until after the gel microspheres harden during heating. In this way, the rigidity of the gel microspheres is maintained during the crucial, initial gel formation stage.

It may, thus, be seen that by the term "volatile inorganic material" it is intended to refer to a material which does not volatilize until the gel microspheres have hardened somewhat during firing at elevated temperatures. These materials may, in general, be characterized as compounds or elements which are complexed by the heavy metal ions or which have low vapor pressures. Applicant has found that chloride preferably added as a metal chloride, as an example of a material which is complexed by the heavy metal ions; or molybdic oxide preferably added as an ammonium molybdate soltuion, as an example of a material which has a low vapor pressure, are especially efficacious as the volatile inorganic pore forming material.

In practicing the invention, there are four basic operations which comprise the process: (1) sol preparation, (2) conversion of the sol into gel microspheres, (3) leaching of the gel microspheres in concentrated alkaline solution to remove anions, and (4) drying and firing the gel microspheres into finished products. The novel refractory fuel microscopes having controlled porosity in accordance with the invention are prepared by one of several methods, depending upon which volatile material is employed. The invention will, for illustrative purposes, hereinafter be presented employing molybdic oxide, or chloride introduced as a metal chloride, as the volatile inorganic pore forming material.

PREPARATION OF SOLS CONTAINING MOLYBDIC OXIDE AS PORE FORMER CHLORIDE SOLS

In preparing these sols, either of two techniques may be employed. First, a heavy metal solution is mixed with an ammonium molybdate solution to form a sol. For this, a solution about 1 M in ammonium molybdate is mixed with solutions about 1 M in tetravalent uranium, thorium, or the like. In the case of uranium, the solution may, for example, be prepared by dissolving $UCl_3$ or $UCl_4$ in water. During dissolution, trivalent uranium is oxidized to the tetravalent state to form 1 M tetravalent uranium chloride solution. Inasmuch as the tetravalent uranium will undergo further oxidation if oxygen is present, the solution preparation step should be carried out in an oxygen-exclusion environment. Preferable mole ratios, e.g., for uranium, range from about 0.01 to 0.8 atom of molybdenum per atom of uranium. In the case of thorium the molybdenum/thorium atomic ratio was more restrictive than for uranium and ranged from 0.3 to 0.5. Ratios lower than 0.3 resulted in elliptical, rather than a spherical product, while ratios higher than 0.6 resulted in a sol which could not be dispersed into round droplets.

As an alternate technique the molybdenum-containing sol can be prepared by mixing the ammonium molybdate solution with a heavy metal sol. Here, as noted hereinabove, a solution of about 1 M in ammonium molybdate is used to provide the source of molybdenum and mixed with, for example, a tetravalent uranium chloride sol to form a 1 M uranium-molybdenum mixed sol. The tetravalent uranium chloride sol may conveniently be prepared, for instance, from the aforementioned tetravalent uranium chloride solution by bubbling $NH_3$-argon into the tetravalent uranium chloride solution until the solution gels, which occurs at a pH between 3.0–3.3, and then melting the gels at about 50° C. to form the tetravalent uranium chloride sol. This alternative technique also permits extension of the thorium range from 0.3 down to 0.1 atom of molybdenum per atom of thorium.

NITRATE SOLS

In similar fashion a solution, such as for example 1 M thorium nitrate, is added to a solution 1 M in ammonium molybdate to form a mixed thorium-molybdate sol having a molybdenum/thorium atomic ratio of between 0.3 to 0.6. It should be noted that for best results the heavy metal solution should be added to the ammonium molybdate solution and not vice versa. When the reverse was tried, the sols did not yield well-shaped spheres; however, higher porosities were obtained. The difficulty experienced with the second procedure is believed attributable to the fact that the sols form very rapidly upon mixing the molybdenum and thorium solutions. Thus, to obtain a uniform sol, it is necessary that the rate of mixing be faster than the rate at which sols form. Accordingly, by injecting rapidly the thorium nitrate soltuion into the ammonium molybdate solution this favorable condition is satisfied, resulting in suitable product microspheres after subsequent processing.

PREPARATION OF SOLS CONTAINING CHLORIDE AS PORE FORMER

In a second method for preparing these refractory fuel microspheres having controlled porosity in accordance with the invention, chloride, added as a chloride salt of a heavy metal solution, is employed as the pore forming material. For this, a heavy metal chloride sol is made employing the same procedure detailed hereinbefore for preparing molybdenum-containing sols by the alternate technique. The metal chloride sol, however, is used alone and is not mixed with an ammonium molybdate solution as previously employed. For example, a tetravalent uranium chloride sol is formed, as previously noted, by bubbling $NH_3$-argon through a tetravalent uranium chloride solution, which is prepared by dissolving $UCl_3$ or $UCl_4$ in water, until gelation occurs and then heating the gel at about 50° C. until the sol is formed.

CONVERSION OF THE SOL INTO GEL MICROSPHERES

Having prepared either a mixed molybdenum-heavy metal sol or a heavy metal chloride sol, the sol is then formed into gel microspheres. The art is quite familiar with the general technique and procedures for preparing gel microspheres from stable aqueous heavy metal sols by passing the sol into a water-immiscible organic liquid to form gel droplets which congeal and settle out to the bottom of the container, such as a tapered column. In such a process the congealed droplets are then separated from the organic liquid by any convenient means, such as filtration, and dried in a suitable atmosphere such as argon. Applicant has found that by providing a aqueous uderlayer of a strong base, such as ammonium hydroxide, in which the gel droplets, initially formed in the water-immiscible organic liquid, are allowed to congeal, affords a convenient way in which undesirable anions may be leached out.

LEACHING OF SOL MICROSPHERES IN CONCENTRATED ALKALINE SOLUTION

It has been found that the degree of porosity of the product microspheres can be controlled by varying the amount of inorganic volatile material contained in the gel microspheres during gelation. In this manner the aqueous underlayer of concentrated alkaline solution, such as ammonium hydroxide, serves as a leachant for removing a portion of the volatile material, as well as to reduce other undesirable anions to a tolerable concentration. By undesirable anions it is intended to refer to those anions which, during calcination, come off and, where contained in sufficient concentration, destroy the macrostructure of the gel microsphere due to excessive volatilization. As is known, high concentrations of nitrate ions, such as above about 0.25 M in gel microspheres will, upon calcination, completely destroy the crystalline macrostructure, reducing the microsphere to fine shards and powder.

Accordingly, it may be seen that the alkaline solution serves two functions: first, it permits a control over the amount of volatile inorganic pore forming material left in the gel microsphere and hence a control over the ultimate porosity of the product microspheres; and secondly, it provides a convenient means for removal of anions, such as for example nitrates and chlorides which if left in high concentrations in the gel microsphere would destroy the microspheres upon calcination. It should be noted here that the essentially complete removal of chlorides, when classified as an undesirable anion, is seen to refer to the method wherein molybdenum is used as the volatile inorganic pore former and comprises preparing the mixed molybdenum-heavy metal sol by addition of ammonium molybdate solution to a heavy metal chloride salt solution or sol. In this instance it should be noted that the molybdenum, as molybdic oxide, constitutes the inorganic pore forming material with essentially all of the chloride being leached out with the alkaline solution. The residual chloride not leached out reacts with molybdic oxide to form molybdenumoxychloride, which volatilizes rapidly during the early portion of the firing step. Thus, it should be appreciated that a residual chloride content is undesirable, because the residual chloride causes loss of the molybdic oxide pore forming material. Typical atomic ratios of chloride to uranium ranged from an original ratio of 3 or 4 in the initial sol to about 0.01 in the gel microspheres. To insure removal of the chloride present the gel microspheres should preferably be left in contact with the alkaline solution for a period of time of at least one hour.

On the other hand, applicant, as noted hereinbefore, has found that by leaving chloride alone, i.e., no molybdenum present, in the gel microspheres, porous refractory fuel microspheres can be prepared as in the case where molybdic oxide was employed as a pore former. Where this method is employed it will be seen that the alkaline leachant serves only to leach out a portion of the chloride, leaving a preselected quantity of chloride in the gel microspheres which serves as the volatile inorganic pore former. As noted in FIGURE 3 it is seen that as would be expected the amount of chloride left in the gel microspheres decreased as the volume of 15 M ammonium hydroxide used for leaching increased.

DRYING AND FIRING TO PRODUCT MICROSPHERES

After the gelation is achieved the gel microspheres are separated from the alkaline solution and dried in an inert atmosphere such as argon. The drying operation may be performed by any convenient method such as oven drying at about 100° C. Thereafter, the dried gel microspheres are fired in an inert atmosphere, such as flowing argon, at an elevated temperature of about 1100°–1300° C. for about one hour to effect porosity in the microspheres by volatilization of the inorganic material. With respect to molybdic oxide and chlorides, the former is believed to be essentially volatilized off at a temperature of about 900° C. whereas the chloride, presumably as hydrogen chloride, is volatilized off at a lower temperature. In any event, maintaining the microspheres at about 1300° C. for one hour produces fully calcined refractory fuel microspheres having high porosities. Having described the invention in general fashion, the following examples are provided to illustrate the quantitative aspects and procedures in greater detail. Example I illustrates preparation of porous $UO_2$ microspheres, using molybdic oxide as the pore former, from tetravalent uranium chloride solutions and Example II demonstrates preparation of porous $UO_2$ microspheres in a similar fashion but from a tetravalent uranium chloride sol. Example III illustrates the preparation of porous $ThO_2$ employing molybdic oxide from an aqueous thorium nitrate solution and Example IV illustrates a similar technique from an aqueous thorium chloride solution. Example V demonstrates a method for preparing mixed porous $UO_2$-$ThO_2$ microspheres employing molybdic oxide as the pore former from an aqueous nitrate solution of mixed thorium and uranium and Example VI demonstrates the preparation of porous $UO_2$ microspheres employing chloride as the pore former from an aqueous tetravalent uranium chloride sol.

Example I

A 1.6 M tetravalent uranium chloride solution was prepared by dissolving a quantity of $UCl_3$ in water. This solution, in turn, was used to prepare three sols 1 M in uranium by mixing the tetravalent uranium chloride solution with ammonium molybdate solution. The molybdenum/uranium ratios were 0.11, 0.32 and 0.53.

Microspheres were formed from these sols by injecting the sol from a syringe onto a layer of 2-ethyl-1-hexanol which was floating on 15 M ammonium hydroxide. In this way the sol stream was dispersed into droplets in the water-immiscible organic solution and the droplets fell into the 15 M ammonium hydroxide underlayer, where the gel droplets congealed.

The congealed microspheres after about 20 hours were removed from the ammonium hydroxide solution and the wet micropheres analyzed. The respective molybdenum/uranium ratios in the microspheres had decreased to 0.07, 0.15 and 0.21 and the chloride/uranium ratios in the microspheres had decreased to 0.02, 0.01 and 0.04 from the original ratio of 3 in the sols. The microspheres were then oven dried at 100° C. for 3 hours and fired in flowing argon for one hour at 1300° C.

A comparison run was made by preparing a 1 M tetravalent uranium chloride sol by bubbling mixed $NH_3$-argon into a 1 M tetravalent uranium chloride solution until gelation occurred and melting the gel at 50° C. to produce the sol. The sol was dispersed into gel droplets and the droplets permitted to congeal in the 15 M ammonium hydroxide underlayer solution for 20 hours. It should be noted that the ammoinum hydroxide, during this congealing period, leached out essentially all of the chloride present (<10 p.p.m.). The results, which are combined with the results of Example II, are given below in Table I and shown graphically in FIGURES 1 and 2.

Example II

A 1.6 M tetravalent uranium chloride sol was prepared by bubbling $NH_3$-argon gas into a 1.6 M tetravalent uranium chloride solution. Portions of this sol mixed with ammonium molybdate solutions to form 1 M uranium sols having molybdenum/uranium atomic ratios of 0.10, 0.29 and 0.77. $UO_2$ microspheres were prepared as in Example I and analyzed. The results are given in Table I below.

TABLE I.—PROPERTIES OF POROUS $UO_2$ MICROSPHERES

| Mo/U Atomic Ratio | | Porosity a | Nitrogen Surface Area (m.²/g.) | Density, Percent of Theoretical | | Crush Strength (g.) |
| --- | --- | --- | --- | --- | --- | --- |
| Sol | Wet Spheres | | | $UO_2$ b | $UO_2$+Open Pores c | |
| 0 | 0 | 5.16 | --------- | 92.2 | 87.5 | 1,740 |
| 0.11 | 0.07 | 21.6 | 0.101 | 102.2 | 78.8 | 340 |
| 0.32 | 0.15 | 23.9 | 0.065 | 93.3 | 71.0 | 170 |
| 0.53 | 0.21 | 2.72 | 0.034 | 101.6 | 73.9 | 100 |
| 0.10 | -------- | 19.2 | 0.067 | 94.8 | 76.6 | 460 |
| 0.29 | -------- | 29.7 | 0.065 | 91.0 | 64.0 | 300 |
| 0.77 | -------- | 34.4 | 0.055 | 97.9 | 64.2 | 270 | a Measured with Hg at 1 atm. and given as % of total volume.
b Calculated using 800 p.s.i., Hg intrusion and X-ray values for $UO_2$.
c Calculated using 15 p.s.i., Hg intrusion and X-ray values for $UO_2$.

Figure 2:
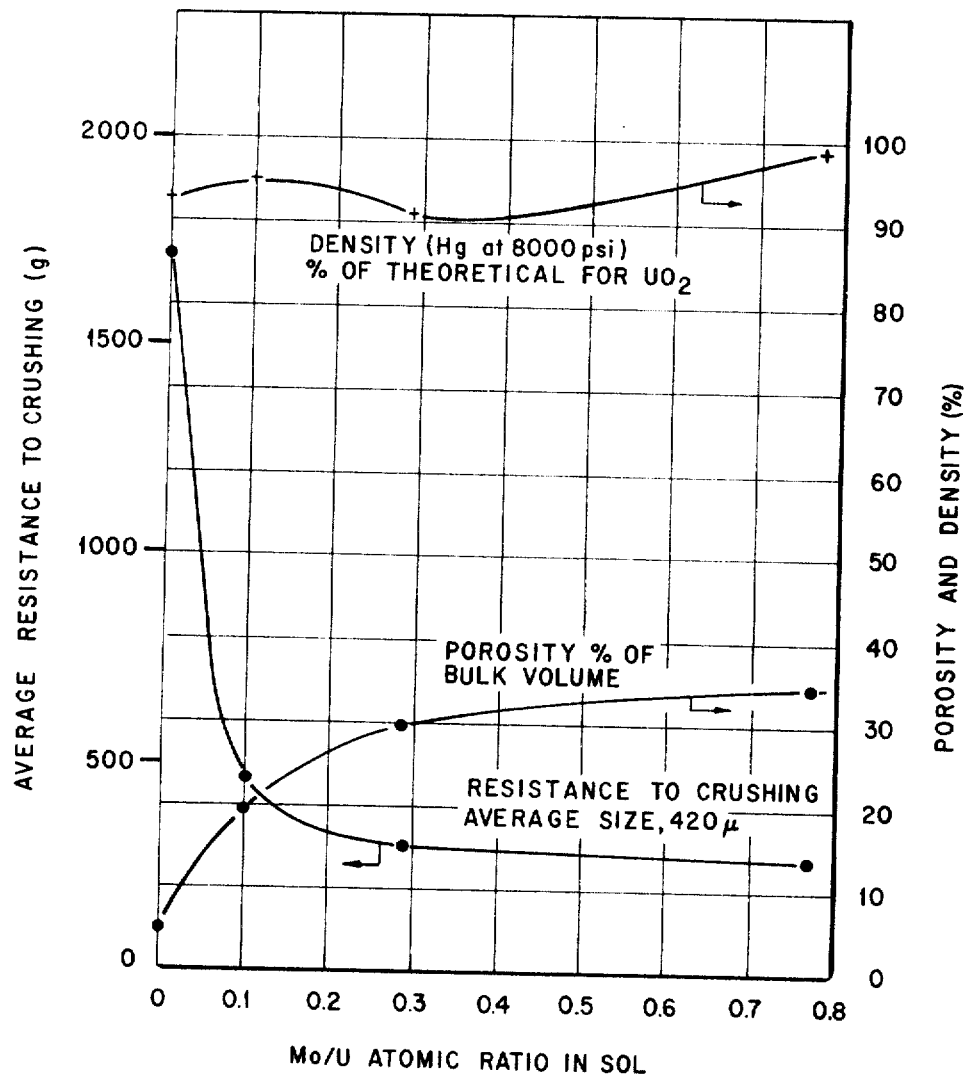
FIGURE 2 is a plot showing porosity and resistance to crushing of fired $UO_2$ microspheres prepared from 1 M tetravalent uranium chloride sol as a function of Mo/U atomic ratio in the sol.

From the results given in Table I the porosity of the $UO_2$ microspheres prepared from the tetravalent urnanium chloride solutions-ammonium molybdate solution increased from 5% (not molybdenum present) to about 27% as the molybdenum/uranium atomic ratio in the sol increased from 0 to 0.53 (FIGURE 1) and in the case of porous microspheres prepared from tetravalent uranium chloride sols-ammonium molybdate solutions increased to a maximum of about 30% for a molybdenum/uranium atomic ratio in the sol of 0.77 (FIGURE 2). The density of $UO_2$ not penetrated by Hg at 800 p.s.i. was very colse to theoretical, indicating that substantially all the pores had been penetrated, i.e., that all were open to the surface. The pore diameters fell in the range of 1 to 10 microns, with most being about one micron in diameter.

It should be observed that the different procedures for preparing the uranium-molybdenum sols, i.e., one from a tetravalent uranium chloride solution and the other from a tetravalent uranium chloride sol, had little, if any, effect on the properties of the product microspheres. The porosities of product microspheres prepared from the tetravalent uranium chloride sol were slightly higher with the higher molybdenum/uranium atomic ratios than those of microspheres prepared from the tetravalent uranium chloride solution. The pore diameters, however, were within about the same range, i.e., 1–10 microns, irrespective of the method employed.

*Example III*

Three sols were made by injecting rapidly from a syringe 1 M thorium nitrate solution into ammonium molybdate solutions. The molybdenum/thorium atomic ratios in the sols were 0.4 to 0.6 and the final thorium concentration was 0.7 M. $ThO_2$ microspheres were prepared from the sols employing the same techniques used for preparing $UO_2$ microspheres in Example I.

The porosity, which varied from 21 to 33%, of the $ThO_2$ micorspheres, unlike the $UO_2$ microspheres, did not appear to be a function of the molybdenum/thorium atomic ratio over the range of from 0.4 to 0.6. The microspheres were well-shaped, although some small nonporous areas were observed in photomicrographs of polished sections.

To compare the effect of varying the method of preparing the thorium-molybdenum containing sol, 3 sols were prepared by stirring ammonium molybdate solutions into 1 M thorium nitrate solution, respectively, resulting in molybdenum/thorium atomic ratios of 0.4, 0.5 and 0.6 and a final thorium concentration of 0.7 M. $ThO_2$ microspheres were formed as before and analyzed after firing at 1300° in argon. The porosity was about 40% for all three ratios. However, the microspheres were poorly shaped with nonuniform porosity having denser areas mixed with pores and were concluded to be generally unsatisfactory. Accordingly, the former method, i.e., injecting the thorium nitrate into the ammonium molybdate solution, is preferred.

*Example IV*

Three sols were made by injecting rapidly from a syringe 1 M thorium chloride solution into ammonium molybdate solutions, respectively. The molybdenum/thorium atomic ratios in the sols were 0.4 to 0.6 and the final thorium concentration was 0.7 M. $ThO_2$ microspheres were prepared from the sols employing the same techniques used for preparing $UO_2$ microspheres in Example I.

The $ThO_2$ microspheres were not analyzed for porosity; however, the density of the $ThO_2$ microspheres, as measured by toluene displacement measurements, varied between 70–88%, indicating a highly porous product.

*Example V*

A mixed uranium-thorium sol was prepared by adding 0.8 M thorium nitrate-0.2 M uranium nitrate to ammonium molybdate solution. The resultant sol was 0.54 M in thorium, 0.13 M in uranium and the molybdenum/(thorium + uranium) atomic ratio was 0.6. Mixed $ThO_2$–$UO_2$ microspheres were prepared employing the same techniques used in Example I.

The porosity of the fired product microspheres was 43.4% and 98% of the pore diameters were in the range of 0.56 to 1.57 microns. Microscopy showed that the product particles were all spherical. Crush resistance of 300 micron-diameter microspheres fell in the range of 200 to 300 g., slightly higher than that observed for pure $ThO_2$ microspheres and pure $UO_2$ microspheres of comparable size and porosity.

*Example VI*

To demonstrate the feasibility of employing chloride as the pore former, tetravalent uranium chloride sols, which were prepared by dissolving $UCl_3$ in water, were prepared by bubbling mixed $NH_3$-argon gas into the 1.0–1.7 M tetravalent chloride solutions until the solutions gelled. This occurred at a pH between 3.0 and 3.3. The gels were then melted by heating to a temperature of about 50° C.

Microspheres were formed from these sols by injecting the tetravalent uranium chloride sol from a syringe onto a layer of 2-ethyl-1-hexanol floating on 15 M ammonium hydroxide as in Example I. The sol was dispersed into droplets in the alcohol and the droplets fell into the 15 M ammonium hydroxide underlayer solution where gelation occurred.

Figure 3:
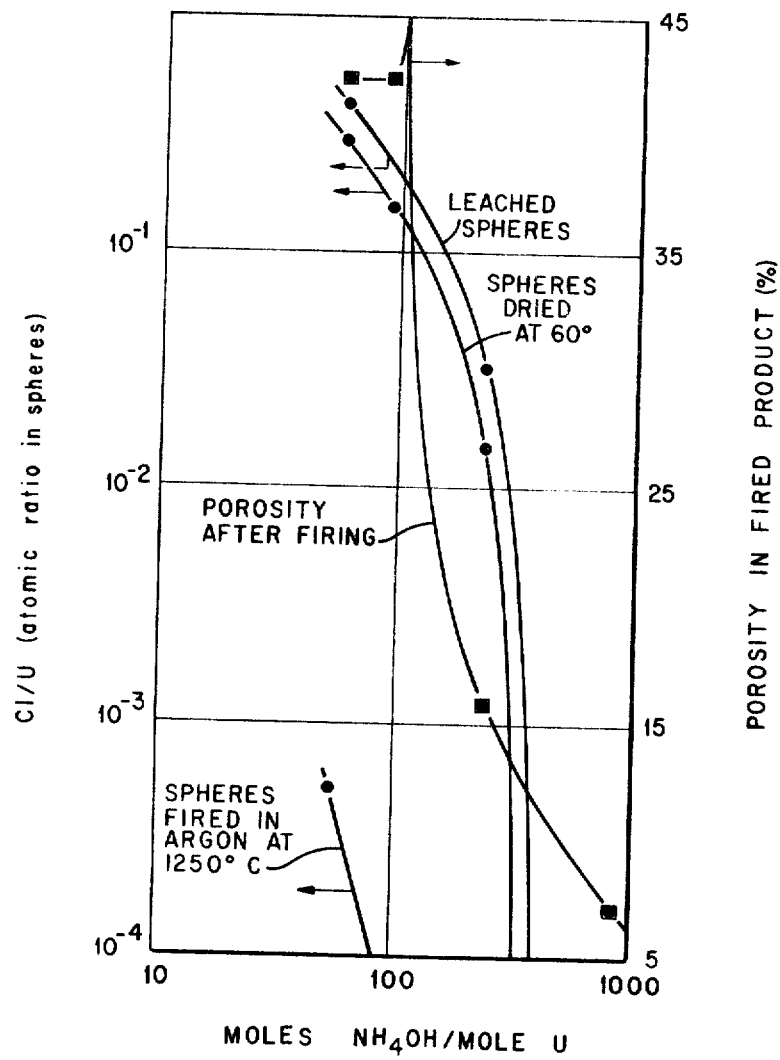
FIGURE 3 is a plot showing porosity of fired $UO_2$ microspheres prepared from 1 M chloride sol as a function of the amount of chloride left in the gel microspheres.

To determine the effect that the volume of 15 M ammonium hydroxide (leachant) has upon the amount of residual chloride in the gel microspheres, a series of experiments were made using increasing volumes of leachant. The results are shown in FIGURE 3.

As would be expected, the amount of chloride left in the gel spheres decreased as the volume of 15 M ammonium hydroxide used for leaching increased. The chloride concentration, in the gel spheres, when leached with 60 moles of ammonium hydroxide per mole of uranium, was 0.43 atom of chloride per atom of uranium, as contrasted to a ratio of 3 in the sol. This ratio decreased to less than $3 \times 10^{-4}$ when 900 moles of ammonium hydroxide were used per mole of uranium. Where ammonium hydroxide/uranium ratios greater than 100 were used, multiple leachings were necessary because the beakers used were not large enough to hold larger volumes of 15 M ammonium hydroxide and probably accounts for the increase in steepness of the slope of the leaching curve.

The porosity of the product microspheres decreased from a maximum of 44% to 7% as the atomic ratio of chloride/uranium in the leached spheres decreased from about 0.2 to less than $10^{-4}$. The maximum porosity which could be introduced into the $UO_2$ microspheres was 44%, which corresponds to an atomic ratio of chloride/uranium of about 0.2 in the wet gel microspheres before firing. When this ratio was increased to between 0.2 and 0.4, the porosity decreased rather than increased. Although the products were still spheres, photomicrographs of polished sections revealed that the pore structure had begun to break down. At ratios higher than 0.43, the product was a powder.

A portion of the gel microspheres was dried in argon at 60° C. to determine whether any chloride was removed during such an opertaion. Very little chloride was removed during such drying. In contrast with this result, firing at 1300° C. removed the chloride. In only one case was more than 10 p.p.m. detected in the fired product microspheres. The chloride/uranium atomic ratio in the leached microspheres for that run was very high (0.4). When the ratio in the gel microspheres was lowered to 0.15 or less by more extensive leaching, the fired product contained less than 10 p.p.m. of chloride. Microspheres having an extremely low porosity of about 1.6% were produced by leaching with ammonium hydroxide circulated through a still to remove chloride. In this case the residual chloride was too small to be detected by the analytical methods used (i.e., less than 10 p.p.m. at an atomic ratio of chloride/uranium of about $10^{-4}$).

Figure 4:
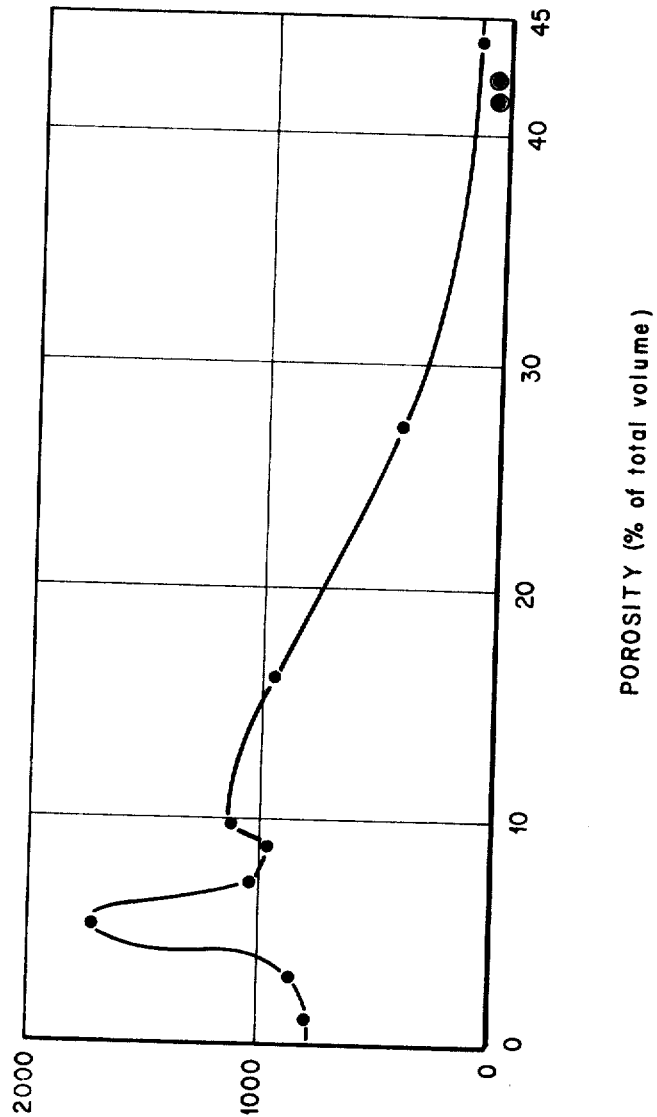
FIGURE 4 is a plot showing the resistance of $UO_2$ microspheres to crushing as a function of porosity.

Resistance to crushing decreased from over 1700g (300 micron-diameter microspheres) at 5% porosity, to 100g at 44 porosity as shown in FIGURE 4. Surprisingly, resistance to crushing decreased as the porosity decreased from 5%, and approached a value of 800g as the porosity approached zero. The two circled points at 42% represent product from gel microspheres in which the chloride/uranium atomic ratio was greater than 0.2 before firing. The onset of deterioration into powder had lowered both the resistance to crushing and the porosities of these products.

It will be understood that this invention is not to be limited to the details given herein but that it may be modified within the scope of the appended claims. It is further to be understood that the porous refractory fuel microspheres prepared in accordance with the invention may be useful in a number of applications. For example, the porous microspheres may be coated with one or more layers of a refractory coating, such as pyrolytic carbon or the porous microspheres may be used uncoated as emitting fuels.

I claim:

What is claimed is:

1. A porous refractory microsphere fuel particle selected from the group consisting of $ThO_2$, $UO_2$, $PuO_2$, and mixtures thereof having an open porosity of at least 15% of the particle volume, wherein pores opening to the surface of said particle communicate with inner pores of said particle.

2. The fuel particle of claim 1 wherein said fuel particle has a resistance to crushing of at least 100 grams.

3. The fuel particle of claim 1 wherein said fuel contains at least one layer of an impervious coating thereabout.

4. The fuel particle of claim 1 wherein said porosity is within the range of from 15–44% of particle volume.

5. A method for preparing porous refractory fuel microspheres by sol-gel techniques wherein gel microspheres are prepared from aqueous sols by dispersing said sol in a water-immiscible organic liquid comprising the steps of incorporating a volatile inorganic material within the gel microspheres and thereafter calcining said gel microspheres at an elevated temperature, thereby effecting volatilization of said inorganic material and pore formation.

6. The method of claim 5 wherein said volatile inorganic material comprises molybdic oxide.

7. The method of claim 6 wherein said molybdic oxide is incorporated into gel microspheres by mixing ammonium molybdate with a second aqueous component selected from the group consisting of thorium, uranium, plutonium or mixtures thereof to form a sol, passing the said sol into a water-immiscible organic liquid to form sol droplets, passing said sol droplets into an aqueous underlayer of alkaline solution to cause gelation of said sol droplets and separating the congealed gel microspheres from said alkaline solution and thereafter drying said gel microspheres in an inert atmosphere.

8. The method of claim 7 wherein said aqueous component is a sol.

9. The method of claim 7 wherein said aqueous component is a solution.

10. The method of claim 7 wherein said water-immiscible organic liquid comprises 2-ethyl-1-hexanol and said alkaline solution is 15 M ammonium hydroxide.

11. The method of claim 5 wherein said volatile inorganic material comprises complexed chloride introduced in the form of a heavy metal chloride.

12. The method of claim 11 wherein said chloride is incorporated into gel microspheres by forming a tetravalent uranium chloride sol, passing said sol into a water-immiscible organic liquid to form sol droplets, passing said sol droplets into an aqueous underlayer of alkaline solution to cause gelation, removing additional chloride to a preselected content by continued leaching with said alkaline solution, and separating the congealed gel microspheres from said alkaline solution and thereafter drying said gel microspheres in an inert atmosphere.

13. The method of claim 12 wherein said water-immiscible organic liquid comprises 2-ethyl-1-hexanol and said alkaline solution is 15 M ammonium hydroxide.

References Cited by the Examiner

UNITED STATES PATENTS

| 2,990,349 | 6/1961 | Roman. |
| 3,270,098 | 8/1966 | Barr et al. _____ 252—301.1 X |

FOREIGN PATENTS

| 935,130 | 8/1963 | Great Britain. |

References Cited by the Applicant

Status and Progress Report ORNL–3680, July 1964, p. 12.

CARL D. QUARFORTH, *Primary Examiner.*

S. J. LECHERT, JR., *Assistant Examiner.*